United States Patent [19]

Ochiai et al.

[11] Patent Number: 4,878,049

[45] Date of Patent: Oct. 31, 1989

[54] INFORMATION TRANSMISSION SYSTEM FOR RAILWAY VEHICLES

[75] Inventors: Hajime Ochiai, Nishinomiya; Kenji Morihara, Takarazuka, both of Japan

[73] Assignee: Mitsubishi Denki Kabushiki Kaisha, Japan

[21] Appl. No.: 716,254

[22] Filed: Mar. 26, 1985

[30] Foreign Application Priority Data

Mar. 27, 1984 [JP] Japan .................................. 59-61380

[51] Int. Cl.$^4$ .............................................. G05B 23/02
[52] U.S. Cl. .................................. 371/5.5; 340/825.16; 371/69.1; 371/8.2; 371/20.1; 455/608
[58] Field of Search ...................... 340/50, 47, 48, 505, 340/825.01, 825.06, 825.16, 356, 346, 350, 354, 526, 825.54, 825.64, 825.04; 246/169 R; 370/16; 371/69, 49, 5, 48

[56] References Cited

U.S. PATENT DOCUMENTS

| | | | |
|---|---|---|---|
| 3,105,955 | 10/1963 | Mauchly | 371/69 |
| 3,252,139 | 5/1966 | Moore | 371/69 |
| 3,377,616 | 4/1968 | Auer, Jr. | 340/346 |
| 4,200,838 | 4/1980 | Poitevin | 371/69 |
| 4,234,953 | 11/1980 | Kline | 371/5 |
| 4,363,123 | 12/1982 | Grover | 371/5 |
| 4,367,550 | 1/1983 | Douverne | 371/5 |
| 4,380,067 | 4/1983 | Beardsley et al. | 371/5 |
| 4,400,811 | 8/1983 | Brown et al. | 371/69 |
| 4,462,099 | 7/1984 | Braun | 371/5 |
| 4,494,717 | 1/1985 | Corrie et al. | 371/48 |
| 4,507,783 | 3/1985 | Austin et al. | 371/49 |
| 4,511,975 | 4/1985 | Nozawa et al. | 371/49 |
| 4,524,445 | 6/1985 | Fujii | 371/49 |
| 4,541,091 | 9/1985 | Nishida et al. | 371/5 |
| 4,558,379 | 12/1985 | Hutter et al. | 371/69 |
| 4,580,265 | 4/1986 | Gooding et al. | 371/49 |
| 4,621,368 | 11/1986 | Onoe et al. | 371/69 |
| 4,647,926 | 3/1987 | Devensky et al. | 340/947 |
| 4,697,265 | 9/1987 | Nozue | 371/5 |

OTHER PUBLICATIONS

"Optical Fiber Type Vehicle Control Information Transmission System Development", by Public Corporation of Nippon Railway Technical Association, Mar. 1983.

Primary Examiner—Joseph A. Orsino
Assistant Examiner—Brent A. Swarthout
Attorney, Agent, or Firm—Leydig, Voit & Mayer

[57] ABSTRACT

An information transmission system is provided for railway vehicles wherein optical transmission between cars of trains is preformed. A predetermined signal corresponding to information to be sent from a transmitting portion is added in succession to the information. The information is then transmitted and a receiving portion receives the information and the additional signal. The receiving portion compares the information and the additional signal to detect a transmission error. When an error rate has exceeded a predetermined value, a predetermined display signal is provided. Also, the transmitting and receiving portions are coupled to an alternative data transmission path.

2 Claims, 3 Drawing Sheets

FIG. I(A) PRIOR ART
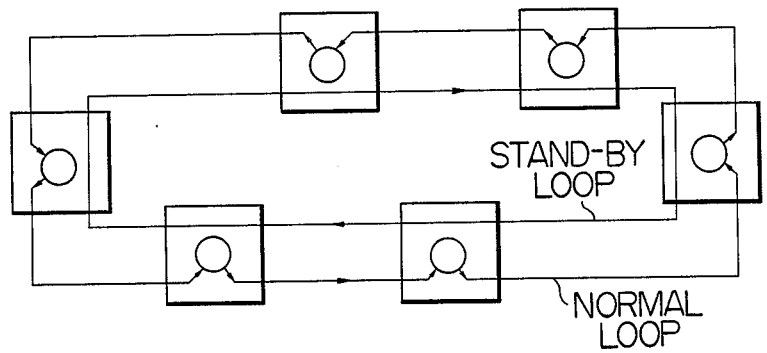
FIG. I(B) PRIOR ART
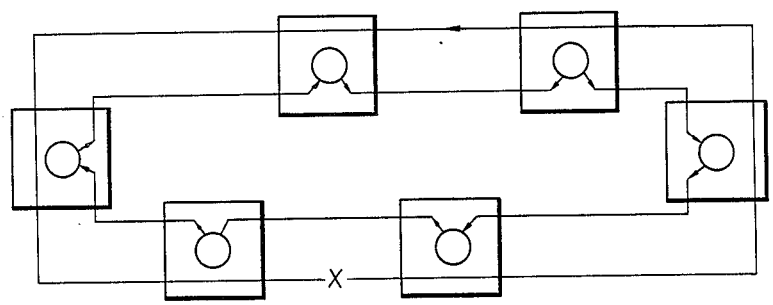
FIG. 3
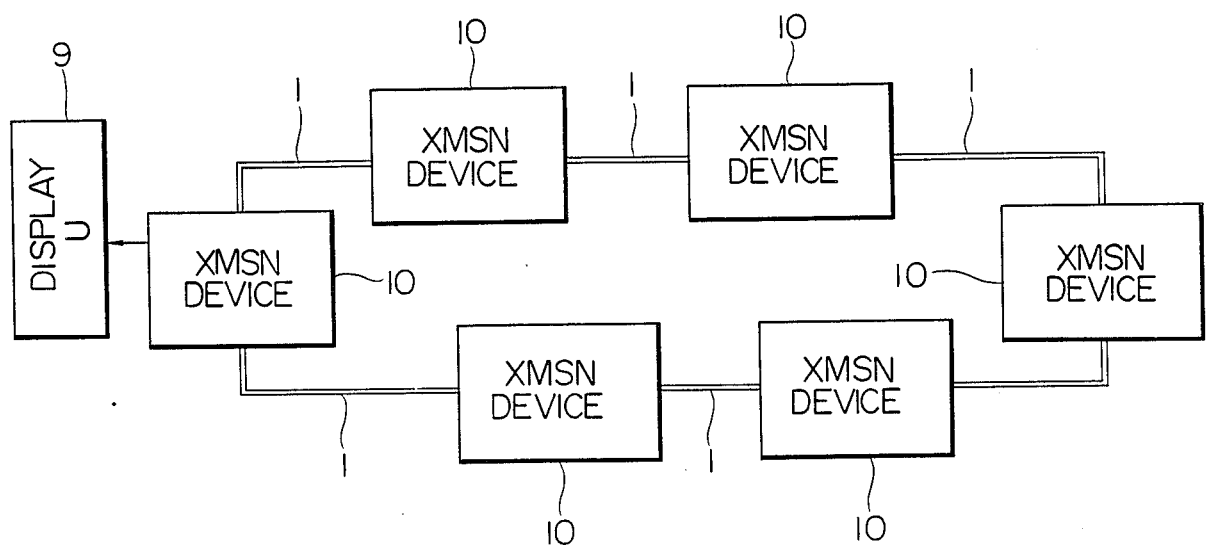

INFORMATION TRANSMISSION SYSTEM FOR RAILWAY VEHICLES

BACKGROUND OF THE INVENTION

This invention relates to an informtion transmission system for railway vehicles which is enhanced in reliability.

Various kinds of electric control devices are installed on the cars of trains. In recent years, it has been developed to transmit by optical fibers information as to whether or not the control devices are normally operating and how they are operating.

As illustrated in FIGS. 1(A) and 1(B), many of optical transmission lines for vehicular information adopt a dual loop organization because of the properties thereof. It is recognized by way of example that, when any fault of the transmission line has occurred during the transmission of information with a normal loop as shown in FIG. 1(A), the path is automatically changed-over to a stand-by loop as shown in FIG. 1(B) so as to minimize the loss of the transmission function. Since, however, the change-over of the paths is effected after the confirmation of the disconnection or the like of the path, the period of time during which the function is lost becomes long. When this period of time is intended to be curtailed, the period of time for acknowledging the occurrence of the fault is shortened, with the result that the unnecessary and erroneous change-over of the paths increases.

SUMMARY OF THE INVENTION

This invention has been made with the object of improving the disadvantage stated above, and provides an information transmission system for railway vehicles wherein a predetermined signal is added in succession to information which is sent from a transmitting portion, while a receiving portion which has received the information compares the information and the signal succeeding thereto to detect an error rate and produces a predetermined signal when the error rate exceeds a predetermined value, whereby a measure can be taken and the transmitting and receiving portions can be coupled to an alternate transmission path before the loss of the function of a transmission line is clarified.

BRIEF DESCRIPTION OF THE DRAWINGS

FIGS. 1(A) and 1(B) are arrangement diagrams of a prior-art optical transmission line for railway vehicles which employs a dual cable;

FIG. 3 is a block diagram showing another embodiment; and

In the drawings, the same symbols indicate identical or corresponding portions.

DESCRIPTION OF THE PREFERRED EMBODIMENTS

Figure 2:
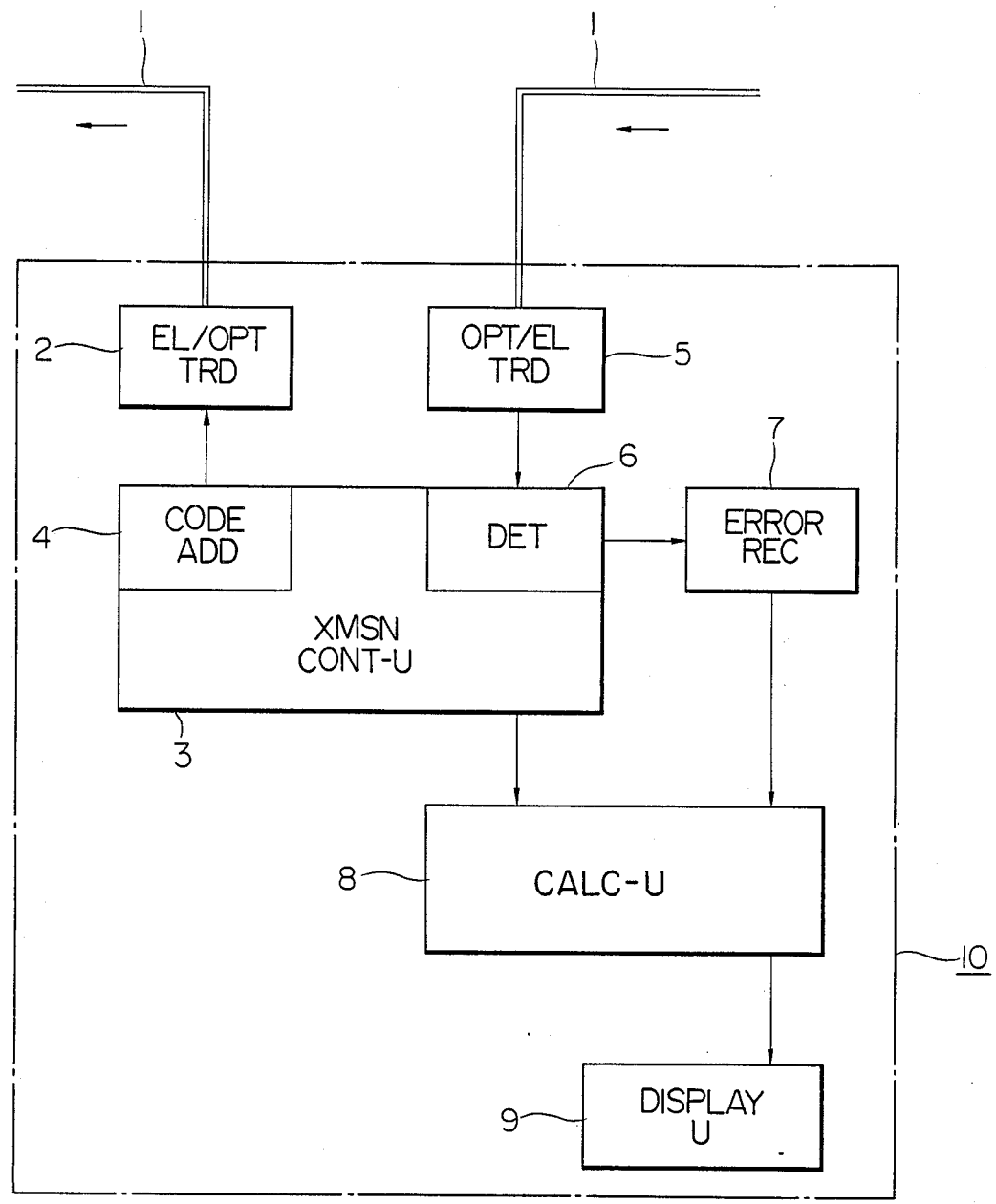
FIG. 2 is a block diagram of an information transmission system for railway vehicles according to an embodiment of this invention.

FIG. 2 is a block diagram showing an embodiment of this invention. Referring to the figure, numeral 1 designates a transmission line which is formed of optical fibers for transmitting information comprising data and error codes, numeral 2 an electrooptic transducer, numeral 3 a transmission control unit, and numeral 4 a code adding part which examines and stores the data to be sent from the transmission control unit 3 by means of a counter and which provides an error code corresponding to the data according to a predetermined coding scheme as an additional signal in succession to the data. Numeral 5 designates an optoelectronic transducer for receiving information, and numeral 6 a detecting part which examines and stores received information by means of a counter and which verifies that the data has been accurately received by checking the received data against the received error code so as to deliver a predetermined signal upon detecting a transmission error. Numeral 7 indicates an error recording unit, numeral 8 an arithmetic unit, and numeral 9 a display unit. The above components 2–9 constitute a transmission device 10. A plurality of such transmission devices 10 are connected as an information transmission system.

With the device of FIG. 2, the data sent from the transmission control unit 3 is succeeded by the error code of the code adding part 4 corresponding to the data. On the other hand, the data and the error code which have been received from another transmission device (not shown) to the detecting part 6 through the optical fiber 1 are checked by this detecting part 6, which produces the predetermined signal upon detecting the disagreement or the transmission error. This signal is recorded by the error recording unit 7.

Here, it is known that the transmission error rate increases when the magnitude of attenuation of the optical signal increases due to the factor of trouble occurring within the optical transmission line. Accordingly, when the number of occurrences of the error detection signal within a fixed period of time exceeds a predetermined number representing imminent decisive loss of function of the transmission line set beforehand, the arithmetic unit 8 determines the excess and displays it on the display unit 9. The above function can be readily effected by employing a microcomputer as the arithmetic unit 8. In this manner, the degradation of the function of the transmission line is displayed on the display unit 9, so that before the decisive loss of the function is reached, a countermeasure can be immediately taken by investigating the corresponding section of the transmission line 1 by way of example.

It is also effective that only one display unit 9 is disposed in the whole transmission system as illustrated in FIG. 3 so as to collectively display the result of the error rate transmitted along with the corresponding section of the transmission line 1 by each transmission device 10.

Figure 4:
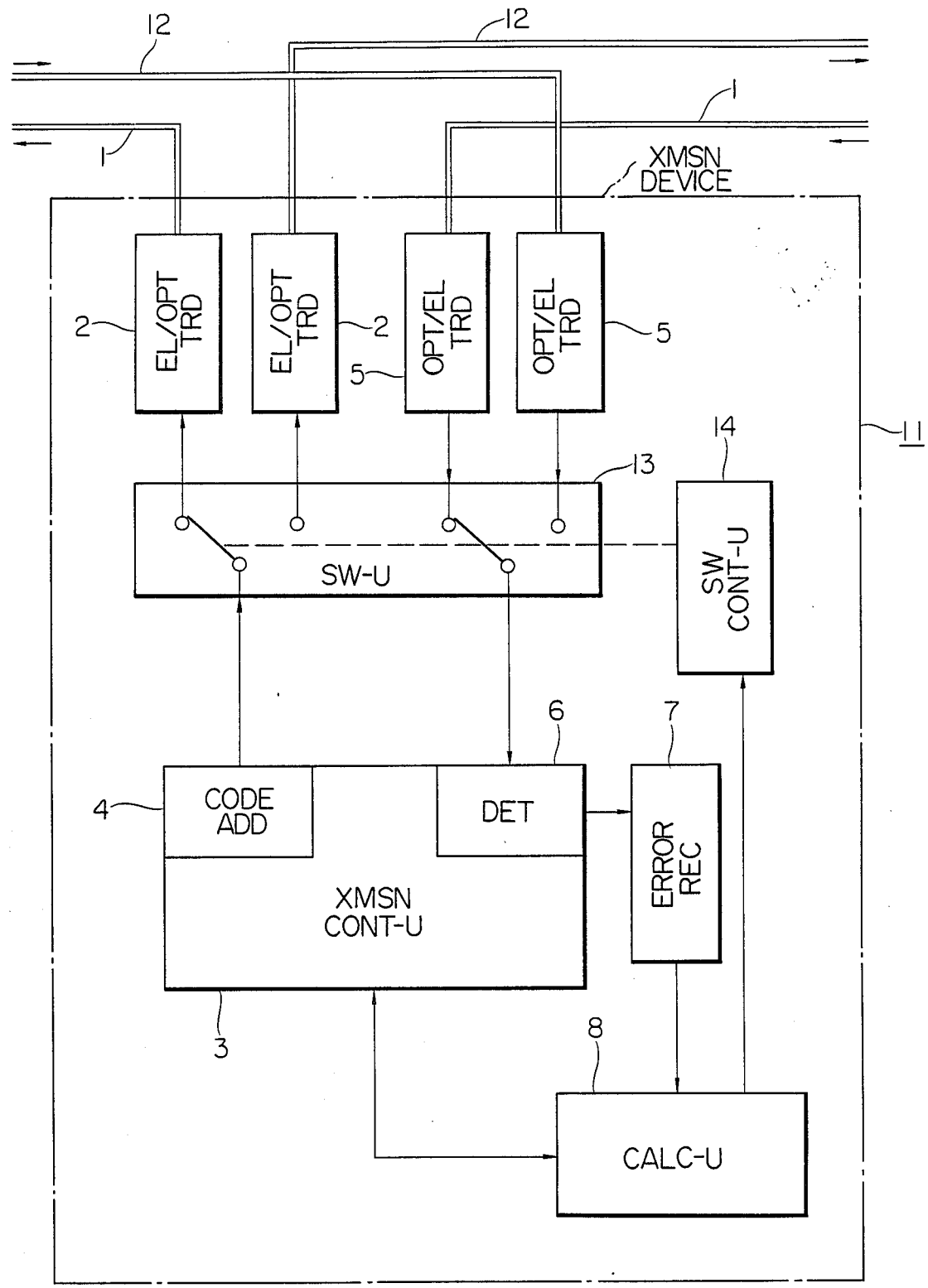
FIG. 4 is a block diagram of an information transmission system for railway vechiles according to still another embodiment.

FIG. 4 shows an arrangement according to another embodiment. A transmission device 11 in the figure comprises two electrooptic transducers 2 and two optoelectronic transducers 5. The transducers 2 or 5 are respectively connected to optical fibers 1 constituting a first path and optical fibers 12 constituting a second path. A transmission path switching unit 13 is interposed between the transducers 2, 5 and a transmission control unit 3, and it is operated by a transmission path switching control unit 14 which is operated by the command of an arithmetic unit 8.

For example, when information is transmitted and received by the electrooptic transducer 2 and the optoelectronic transducer 5 which are connected with the optical fibers 1 as shown in the figure, an error code corresponding to the data is transmitted in succession to the data by a code adding part 4, and the received data is checked against the received error code by the detecting part 6 of another transmission device 11 which has received the information. Upon detecting a transmission error, the detecting part 6 provides a predetermined signal which is stored by an error recording unit 7. Accordingly, when the transmission errors detected within a predetermined period of time have exceeded a predetermined number previously set, the arithmetic unit 8 operates to actuate the transmission path switching control unit 14. Thus, the transmission path switching unit 13 is changed-over from the first path connected with the optical fibers 1 to the second path connected with the optical fibers 12.

As set forth above, according to this invention, an error code corresponding to data to be sent from a transmitting portion is transmitted in succession to the data, and a receiving portion verifies the transmitted information by checking the received data against the received error code to detect a transmission error of the information and to produce a predetermined signal when the number of the transmission errors detected within a predetermined period of time has exceeded a preset number, whereby before it is confirmed that the transmission line has been lost, e.g., disconnected, the transmission line can be changed-over so as to continue to maintain the transmission function. Furthermore, since a change-over can be conveyed to respective transmission devices in advance, the transmission lines can be simultaneously changed-over in a short time, and the period of time during which the transmission function is lost can be sharply reduced. Thus, the reliability is enhanced.

What is claimed is:

1. In an information transmission system wherein information is transmitted optically between cars of a train, a transmission device comprising:
   means for transmitting information including data and an error code over a transmission line, said transmitting means including means for adding in succession to the data an error code corresponding to the data to provide the information for transmission,
   means for receiving information including data and an error code from the transmission line, said receiving means being coupled to the transmitting means and including means for checking the received data against the received error code to detect a transmission error,
   means for determining an error rate at which the transmission error occurs,
   means for providing a predetermined signal when the error rate exceeds a predetermined value representing imminent decisive loss of function of the transmission line and for transmitting and receiving over another transmission line responsive to the signal, whereby loss of communication is prevented responsive to the predetermined signal, and
   display means responsive to the predetermined signal for indicating the excess of the error rate over the predetermined value.

2. In an information transmission system wherein multiple transmission paths are included for optically transmitting information between cars of a train and wherein, when one path fails to function, transmission is changed over to another path, a transmission device comprising:
   means for transmitting information including data and an error code over a transmission line, said transmitting means including means for adding in succession to the data an error code corresponding to the data to provide the information for transmission,
   means for receiving information including data and an error code from the transmission line, said receiving means being coupled to the transmitting means and including means for checking the received data against the received error code to detect a transmission error,
   means for determining an error rate at which the transmission error occurs,
   means for providing a predetermined signal when the error rate exceeds a predetermined value representing imminent decisive loss of function of the transmission line,
   means for coupling the multiple transmission paths to the transmitting means and the receiving means, said coupling means including means responsive to the predetermined signal for changing over from one path to another, and
   display means responsive to the predetermined signal for indicating the excess of the error rate over the predetermined value.

* * * * *